Nov. 5, 1968  A. R. EDWARDS  3,409,152
APPARATUS FOR THE STORAGE OF ARTICLES
Filed Dec. 2, 1964  4 Sheets-Sheet 1
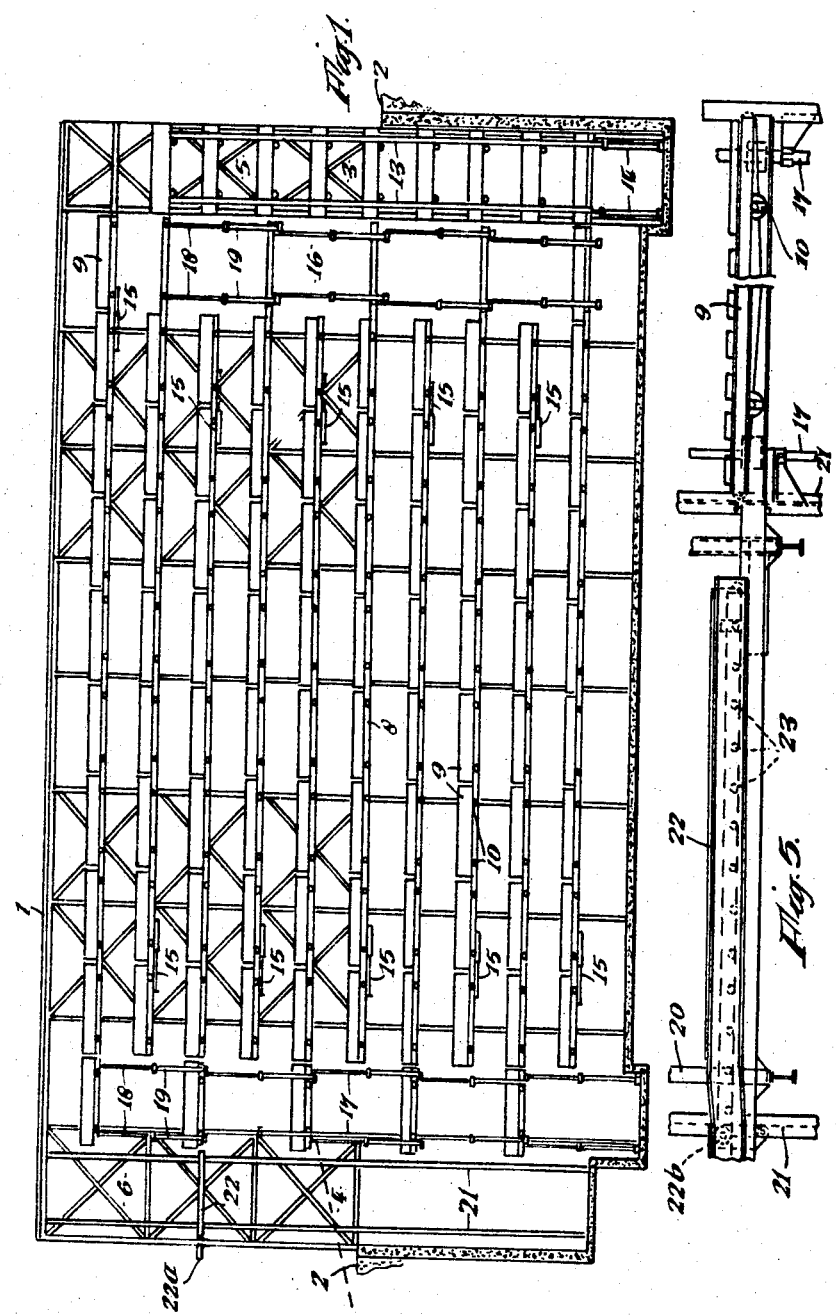
ARTHUR REGINALD EDWARD
INVENTOR
By:
ATTORNEYS

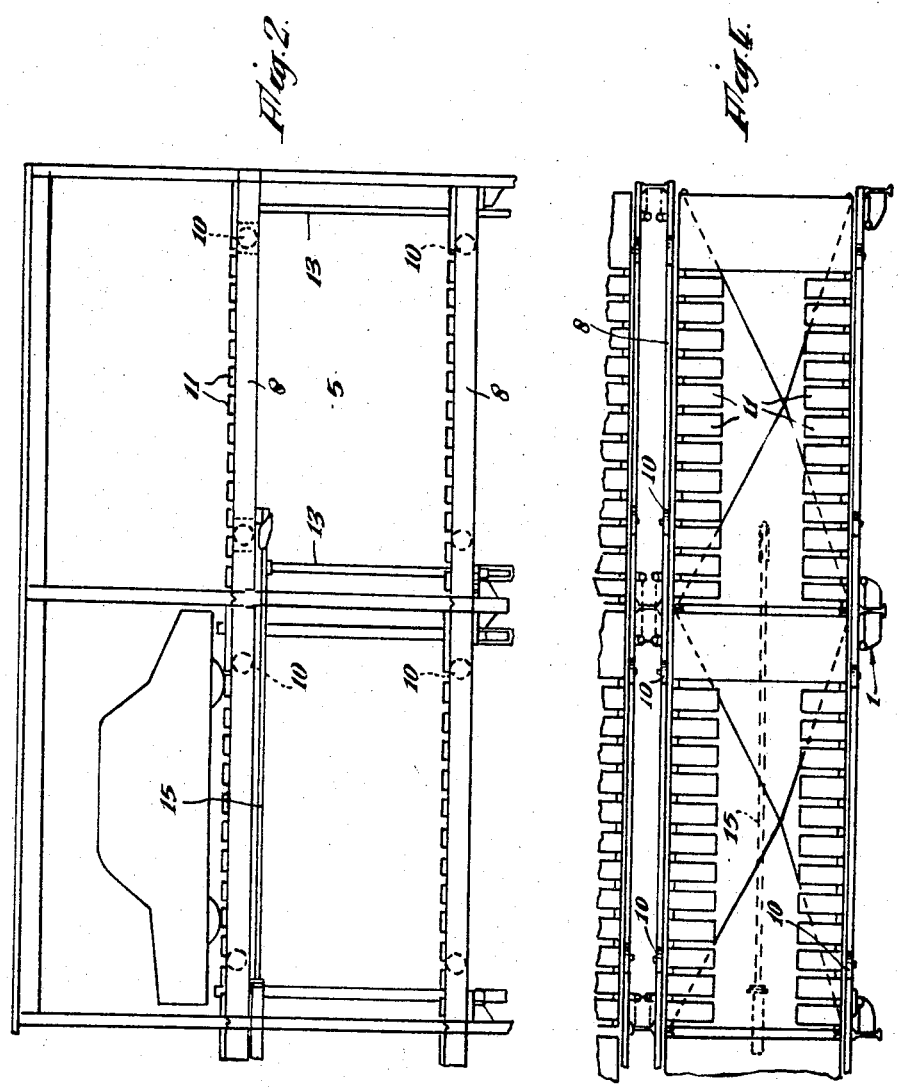

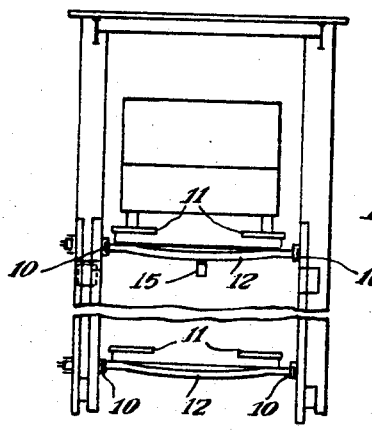
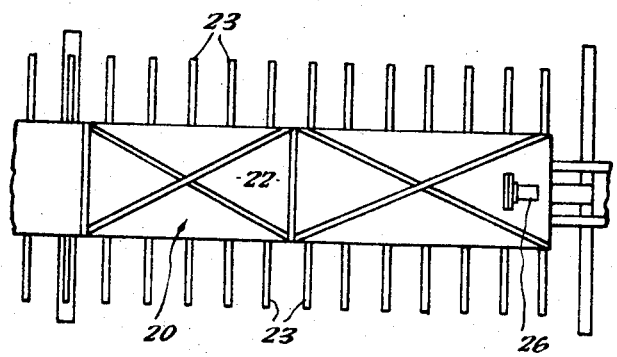
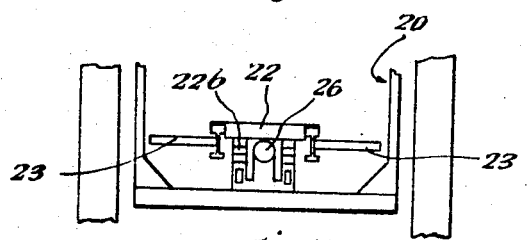

Nov. 5, 1968 A. R. EDWARDS 3,409,152
APPARATUS FOR THE STORAGE OF ARTICLES
Filed Dec. 2, 1964 4 Sheets-Sheet 4
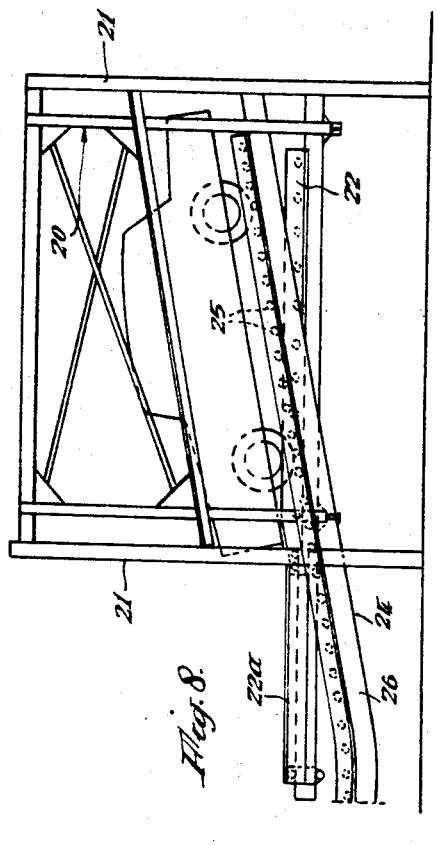
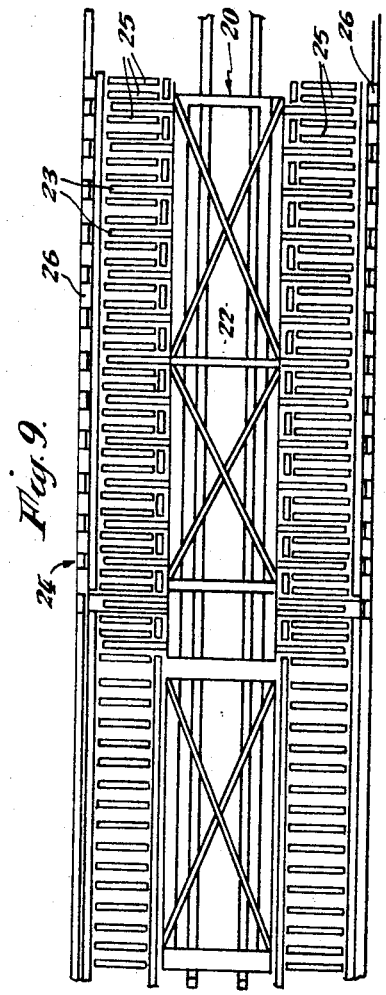
ARTHUR REGINALD EDWARDS
INVENTOR
BY:
ATTORNEYS

United States Patent Office 3,409,152
Patented Nov. 5, 1968

3,409,152
APPARATUS FOR THE STORAGE OF ARTICLES
Arthur Reginald Edwards, 18 Portway,
Frome, Somerset, England
Filed Dec. 2, 1964, Ser. No. 415,359
3 Claims. (Cl. 214—16.4)

ABSTRACT OF THE DISCLOSURE

Apparatus for the storage of articles, such as cars, is formed by a vertical stack of horizontal trackways and a plurality of platforms, on which the articles are placed, are movable on the trackways. Lifts are at the ends of the stack to move platforms from one trackway to another, and puller devices are adapted to move the platforms along the respective trackways and on and off the lifts so that the platforms may be moved in sequence through the apparatus. Articles are placed on the platforms when successive platforms are at an input position. For removing selected articles a transport device having prongs extending therefrom is adapted to move vertically parallel to one of the lifts and is movable horizontally to be projected into and retracted from the path of that lift so that the prongs pick an article off a selected platform on that lift. An inclined ramp across the vertical path of the transport device has fingers extending in the plane of the ramp and offset in a vertical direction to be in an interfingering relationship with the prongs of the transfer device so that the transfer device can descend through the ramp and thereby transfer an article, which is on the prongs, onto the ramp.

---

The present invention relates to apparatus for the storage of articles.

According to the present invention there is provided apparatus for the storage of articles having an input position and an output position and a plurality of supporting means arranged in a sequence in the apparatus adapted each to support an article for storage in the apparatus, the supporting means being capable of movement in the said sequence relative to each other within the apparatus, and means for transferring a selected article stored in the apparatus from a said supporting means within the apparatus to the output position from any one of a plurality of positions in the said sequence of supporting means, the selected article being transferable from one position of the said plurality of positions without further movement of the selected article with its supporting means in the sequence.

One embodiment of the present invention is a multistorey car park which will now be described by way of example with reference to the accompanying drawings, wherein:

FIGURE 1 is a side elevation of the general layout of the car park.

FIGURE 2 is a side elevation of a plurality of support platforms within the car park.

FIGURE 3 is an end elevation of the support platforms shown in FIGURE 2.

FIGURE 4 is a plan view of two support platforms shown in FIGURES 2 and 3.

FIGURE 5 is a side elevation of a support platform and part of a take-off fork.

FIGURE 6 is a plan view of the part of the take-off fork shown in FIGURE 5.

FIGURE 7 is an end elevation of the take-off fork of FIGURES 5 and 6 mounted within a lift cage.

FIGURE 8 is a side elevation of a roller discharge ramp and the take-off fork within its lift cage.

FIGURE 9 is a plan view of the roller discharge ramp and take-off fork of FIGURE 8.

Referring to the drawings, the car park 1 is constructed of steel girders or the like so as to extend partly above and partly below the ground level 2. The car park has an entrance 3, and an exit 4 giving access to the lift shafts 5 and 6 respectively so that cars can be transported for storage onto any one of the storeys of the car park, in this case there being ten storeys. Each one of the storeys is formed by two horizontal parallel rails 8 and a number of wheeled support platforms 9 are arranged in the car park so that they can run along the rails 8 on their wheels 10. Each platform 9 is arranged to support a car, and has two sets of support slats 11 extending one along each side with gaps between adjacent slats on each side, and a drip tray 12 located immediately beneath the slats 11 so that the car rests with its wheels on the slats 11 with the tray 12 catching any drips from the supported car. Adjacent platforms 9 are not coupled together.

The lift shaft 5 includes four vertical operating lifting rods 13 which extend upwardly from the cylinders 14 to engage by means of catches all those support platforms 9 which are in the lift shaft 5. These lifting rods 13 are operated by means of the cylinders 14 to move up and down through the distance separating adjacent storeys and the support platforms 9 are equipped with latch mechanisms so that as the rods 13 move upwardly each platform 9 is moved up one storey, retained at that storey and released from the rods 13 so that these rods can then move downwardly to complete one cycle of operation. The rails 8 of the uppermost storey only extend across the shaft 5; gaps in the horizontal flanges of those rails permit the upward passage of the wheels of a supporting platform 9 to the level of the uppermost storey.

The support platforms in each storey can be wheeled along the appropriate storey by means of a puller rod 15 which can latch onto the platforms, being extendable beyond the end of the fixed rails 8 to catch onto platforms supported on the various lift means which will be described.

Two sets of lowering devices 16 and 17 are mounted one at each end of the storeys (except the uppermost, in the case of device 16) next to the lift shafts 5 and 6 respectively so that the support platforms 9 can descend from one storey to another so as to circulate in sequence through the car park. Each lowering device comprises rail sections mounted on four pistons 18 mounted for reciprocating movement in cylinders 19 so that they can be raised to lift a lowering device into a position where a support platform 9 in an upper storey can be pushed onto the device, and then these pistons 18 can be retracted into the cylinders 19 so as to lower that support platform 9 to the storey immediately beneath.

The exit lift shaft 6 has a lift cage 20 in which is mounted a slidable take-off fork 22. The cage 20 can move in the shaft sliding on vertical bearing members 21 in the normal manner of a lift-cage. The take-off fork is designed so that when it is level with any storey of the car park it can slide into engagement with an adjacent support platform 9 on the lowering device 17 at the end of that storey. The take-off fork comprises a central stand 22 having laterally outwardly extending prongs 23, and is dimensioned so that when it is moved towards the centre of the park above a lowering device 17 with a support platform 9, the stand 22 passes between the sets of platform slats 11 above the drip tray 12, with the outwardly extending prongs 23 also above the drip tray 12 and immediately beneath the slats 11 to coincide with the gaps between adjacent slats 11 so that when the lowering device is lowered a car standing upon it is transferred to the take-off fork 22, which is then slid to retract into the shaft 6.

The construction of the fork 22 is seen best from FIGURE 8. The fork has a tail 22a which supports the fork 22, on rollers 22b, in the cage 20 when the fork is in an extended position, in which it lies in the path of a support platform 9 on a lowering device 17.

A roller discharge ramp 24 which is mounted across the lift shaft 6 at ground level, slopes downwardly across the lift shaft with its lower outer end resting on the ground. This discharge ramp 24 comprises a series of freely rotatable rollers 25 which extend inwardly from the two side members 26, these rollers 25 being spaced so that the take-off fork 22 in its retracted position can pass through the ramp 24, with its central stand passing between the series of rollers 25 and its prongs 23 passing through the gaps between adjacent rollers (see FIGURE 9). The ramp 24 may be adapted to allow for upwards movement of the lift cage 20 from below to above its level; the sets of rollers 25 at each side of the ramp may each be pivotable about an axis extending along the edge of the ramp to lie vertical, to offer a passage between them for the cage.

In the operation of the car park, a car is drawn onto a support platform 9 situated at the car park entrance 3 and the car hand brake is applied. The lifting rods 13 are operated to move up and down once so that all the support platforms 9 in the lift shaft 5 move up one storey, the lowering devices 17 are lowered together, loaded each with a support platform, as the lowering devices 16 move up empty. The rods 13 in the shaft 5 having operated leaves a vacant place at the bottom position of that shaft. Then the puller devices 15 on the first, third, fifth, seventh and ninth storeys are operated to move the support platforms in those storeys to the right, so that the endmost support platform at the right in the third, fifth, seventh and ninth storeys is loaded onto the lowering device 16, and that at the bottom storey is moved into the lowermost position of the lift shaft 5. This same movement takes support platforms off the lowering devices 17 leaving them empty. Then the devices 17 move up empty and devices 16 move down with supporting platforms loaded on them. Then the puller devices 15 on the second, fourth, sixth, eighth and tenth storeys operate to move supporting platforms to the left in those storeys so as to load left hand supporting platforms onto device 17 and to draw the top support platform out of the lift shaft 5 onto the tenth storey. Meanwhile another car may have been loaded into the lift shaft 5 in position 3, and on movement of the pusher rods 13 down and up again the next step of movement of supporting means in sequence is carried out.

In this way a support platform 9 whether vacant or carrying a car circulates in the car park in a fixed sequence relative to all the other platforms in the park, past the entrance 3, ascending the lift shaft 5, moving from right to left along the uppermost storey, descending by means of the top lowering device 17 to the ninth storey, from left to right in this storey, descending by a device 16 to the eighth storey, moving along this storey from right to left and so on until each platform arrives in turn at the bottom of the lift shaft 5 ready to recirculate. A car can be stored during this circulation for as long as required. In order to retrieve a stored car in the park the platforms 9 are circulated only until the platform containing the required car is at the left hand end of any storey. Thus, at any one time, there are a plurality of positions for supporting platforms available from which a selected car may be moved to the output position of the park without further movement of the selected article on its supporting platform in sequence. The lift cage 20 is operated in the lift shaft 6 to be on a level with the particular platform 9, and the take-off fork 22 slid into engagement with the platform in the above described manner, and then the appropriate lowering device 17 is lowered so as to leave the required car on the take-off fork 22. This fork 22 is then retracted into the lift shaft 6, and lowered by the lift until it reaches the discharge ramp 24. Due to the above described spacing of the fork 22 and ramp 24, this fork 22 is operated to descend through the ramp 24 so as to leave the car standing on the ramp rollers 25. Although the car hand brake is applied, the car can be easily run down the rollers 25 of the inclined ramp 24 ready to be collected and driven away.

Thus a car has been transferred from within the park to the output position without a complete circulation of support means until a unique output position is reached. The cars stored can be reached for transference in a sequence independent of that in which the supporting platforms move overall within the apparatus.

It will be appreciated that with this construction of car park, a considerable number of cars can be stored for any desired period of time, and any of the required cars can be retrieved from any position in the car park without upsetting the parking order of the majority of the remaining cars in the park.

Movement of support means within the apparatus can be effected by any desirable means such as for example, either pneumatically, hydraulically, mechanically or electrically or any desirable combination of these means.

In modified versions of this embodiment, the car park can extend either entirely above the ground level or entirely below the ground level; and when the car park is entirely or partly below ground discharge can be effected by a pulling device engageable with a car and operable to draw a car off the lift at ground level.

Apparatus according to the invention has a large number of applications amongst which, are for example, the multistorey car park which has been described in which any selected car can be brought to the exit without seriously inconveniencing the remaining parked cars, a coin freed vending machine in which any pre-selected article can be ejected from the machine on inserting the required coins, and a letter sorting device in which selected letters can be ejected from particular output positions according to their ultimate intended destinations.

What I claim and desire to secure by Letters Patent is:

1. Apparatus for the storage of articles having a plurality of platforms for supporting articles to be movably supported on a plurality of horizontal trackways arranged in a stack; means, including vertical lift means respectively at opposite ends of the stack, for moving the platforms along the trackways and from one trackway to another; said apparatus having an input position at which the platforms are successively in position to receive articles; and means for selectively removing articles from the platforms comprising a transport device, means for moving the transport device vertically parallel to one of said lift means, means for projecting the transport device into, and then, retracting it from, the path of said one of said lift means, said transport device having prongs extending therefrom for receiving an article from a platform on said one lift means when it is projected into the path of said one lift means and for supporting said article when it is retracted from said path, an inclined ramp across the vertical path of the transport device having fingers extending in the plane of the ramp and offset in a vertical direction to be in an interfingering relationship with said prongs, when the transport device is in retracted position, for permitting the transport device to descend through the ramp and thereby transfer an article on the prongs onto the fingers of the ramp.

2. The apparatus of claim 1 in which said fingers of the ramp comprise rollers mounted for permitting an article transferred to the fingers to roll down the ramp.

3. The apparatus of claim 1 in which said means for moving the platforms along the trackways and from one trackway to another comprise: first lift means at one end of the stack for receiving a platform from the lowermost trackway and lifting it to a position in line to move onto the uppermost trackway; second lift means at said one end of the stack for receiving platforms respectively from the next uppermost trackway, from the third trackway above the lowermost and from alternate trackways between, and lowering them respectively to positions in line to move onto the next lower trackway; third lift means at the other end of the stack for receiving platforms respectively from the uppermost trackway, from the next lowermost trackway and from alternate trackways between, and lowering them respectively to the next lower trackways; means for moving a platform from the first lift means onto the uppermost trackway and for moving a platform on said uppermost trackway onto the third lift means; means for moving a platform from the third lift means onto the lowermost trackway and for moving a platform on said lowermost trackway onto the first lift means; means for moving platforms from the third lift means respectively onto the next uppermost trackway and alternate trackways therebelow, and for moving platforms from said next uppermost trackway and from alternate trackways therebelow respectively onto the second lift means; and means for moving platforms from the second lift means respectively onto the third from the uppermost trackway and from alternate trackways therebelow, and for moving platforms from said third from the uppermost trackway and from alternate trackways therebelow respectively onto the third lift means.

References Cited

UNITED STATES PATENTS

| | | |
|---|---|---|
| 2,711,616 | 6/1955 | Weller et al. _____ 214—16.1 |
| 2,838,186 | 6/1958 | Alimanestiano _____ 214—16.1 |
| 2,864,515 | 12/1958 | Marshall _____ 214—16.1 |
| 3,175,722 | 3/1965 | Paulssen _____ 214—16.1 |
| 3,229,826 | 1/1966 | Blacklock et al. _____ 214—16.4 |
| 3,240,365 | 3/1966 | King _____ 214—16.4 |

FOREIGN PATENTS

| | | |
|---|---|---|
| 1,236,278 | 6/1960 | France. |
| 59,900 | 11/1925 | Sweden. |

HUGO O. SCHULZ, *Primary Examiner.*

R. B. JOHNSON, *Assistant Examiner.*